United States Patent [19]

Okino

[11] Patent Number: 4,527,880

[45] Date of Patent: Jul. 9, 1985

[54] FLASH DEVICE AND/OR PHOTOGRAPHIC APPARATUS USABLE WITH THE SAME

[75] Inventor: Tadashi Okino, Tokyo, Japan

[73] Assignee: Canon Kabushiki Kaisha, Japan

[21] Appl. No.: 562,705

[22] Filed: Dec. 19, 1983

[30] Foreign Application Priority Data

Dec. 25, 1982 [JP] Japan ................................ 57-234820

[51] Int. Cl.³ ............................ G03B 3/00; G03B 7/00
[52] U.S. Cl. .................................... 354/403; 354/417; 354/421
[58] Field of Search ............... 354/400, 402, 403, 413, 354/416, 417, 421

[56] References Cited

U.S. PATENT DOCUMENTS

| 4,284,337 | 8/1981 | Ito et al. ............................... 354/400 |
| 4,360,258 | 11/1982 | Hashimoto ........................... 354/400 |
| 4,429,966 | 2/1984 | Hosoe et al. ......................... 354/417 |
| 4,444,477 | 4/1984 | Tamura ................................ 354/403 |

OTHER PUBLICATIONS

*Photographic Industry*, Dec. 1981, pp. 68–83.

Primary Examiner—Russell E. Adams
Attorney, Agent, or Firm—Toren, McGeady, Stanger, Goldberg & Kiel

[57] ABSTRACT

In the system disclosed, a focus lock drives an automatic focus adjusting arrangement and a signal output arrangement controls the light output of a flash unit on the basis of distance information obtained from the automatic focus arrangement. A selector permits a flash to have its light output controlled on the basis of measured light or distance information.

17 Claims, 4 Drawing Figures

FLASH DEVICE AND/OR PHOTOGRAPHIC APPARATUS USABLE WITH THE SAME

BACKGROUND OF THE INVENTION

1. Field of the Invention

This invention relates to flash devices, photographic apparatuses using the same, or both, and more particularly to flash units which control the amount of light, photographic apparatuses having automatic focus adjusting devices coupled with such flash units, or both.

2. Description of the Prior Art

Recently, a large number of auto-focus cameras have been developed and been made commercially available. These cameras generally include so-called focus locking devices which are designed to operate on a very narrow target area. When a photographer aims at a subject such as two persons standing side by side at an appreciable distance, the rangefinder spot on the focusing screen may lie between the images of the two persons. Composed in this way, when the auto-focus device is released, the camera focuses not on the two persons which are the subject of principle interest, but on the background. To prevent this, the focus locking device permits preliminary framing with the rangefinder spot directed on the subject of principle interest.

The use of such focus locking devices provides reliability in setting the automatic focus adjustment to the subject of principle interest no matter what position that subject takes in the picture frame.

At the same time, flash units exist which include light control devices that control the amount of light in a flash. Such controls integrate the amount of light reflected from an object to a prescribed level, and upon attaining this level terminate the flash.

Such a flash may be combined with an auto-focus camera. In that case, after a focus locking operation with the subject of principle interest toward the corner of the format, the camera takes the picture with flash illumination. However, the subject of principle interest may not then be positioned in front of the camera. Hence, the amount of light reflected from the subject of principle interest may be decreased and the flash unit's light control device may respond mainly to light reflected from the background. This may result in an overexposed photograph of the subject.

On the other hand, without the use of the focus locking device the subject of principle interest is necessarily positioned at the front and permits the light control to control the light in the flash to otain a proper flash exposure.

SUMMARY OF THE INVENTION

With the foregoing in mind, it is an object of the invention to provide a photographic apparatus using an automatic flash device capable of obtaining a proper exposure even when the principal interest subject is not located just in the center of the finder.

It is to be noted here that such photographic apparatus may be constructed either as a unit with the flash device of separately.

Another object of the invention is to provide a flash device of which the amount of irradiating light is adjusted either in accordance with the reflected light from the object when focusing is not locked, or in accordance with the measured distance data when focusing is locked.

Still another object of the invention is to provide a photography system comprising the photographic apparatus and the flash device.

These and other objects of the invention will become apparent from the following detailed description of embodiments thereof taken by reference to the accompanying drawings.

DETAILED DESCRIPTION OF THE PREFERRED EMBODIMENTS

Figure 1:
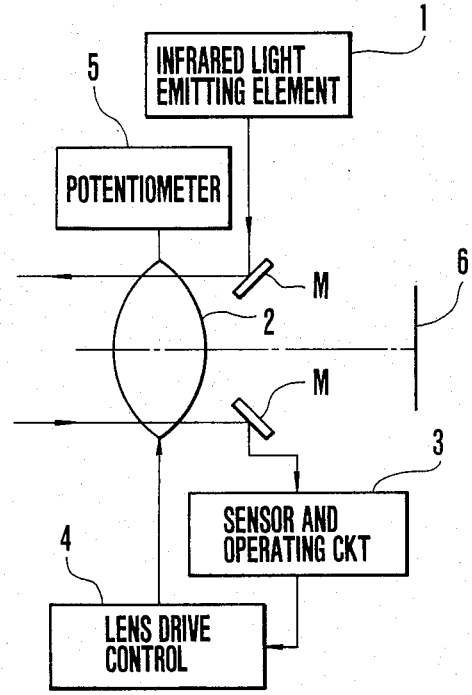
FIG. 1 is a schematic view, partly in block form, of an embodiment of an auto-focus camera according to the present invention.

FIG. 1 illustrates the auto-focus camera of the invention having an infrared light emitting element 1, an objective lens 2 for focusing an image of an object on a plane 6, a light sensor and operating circuit 3, a drive mechanism 4 for focus adjustment of the lens 2, and a lens position detecting potentiometer 5.

Infrared light from element 1 is projected through lens 2 onto an object to be photographed. The reflected light from the object passes back through the lens 2 and is received by sensor and operating circuit 3. Circuit 3 produces an output signal representing the degree of image sharpness, and in response thereto drive mechanism 4 focuses the lens 2. As a sharp image of the object is formed on plane 6, the actual position of lens 2 is detected by potentiometer 5 having an output in the form of a voltage proportional to the object distance.

It is desirable to use an optical filter whose transmittance ranges around the wavelength of the projected infrared light in front of the sensor in order to increase the spectral sensitivity for the reflected infrared light from the object.

Figure 2:
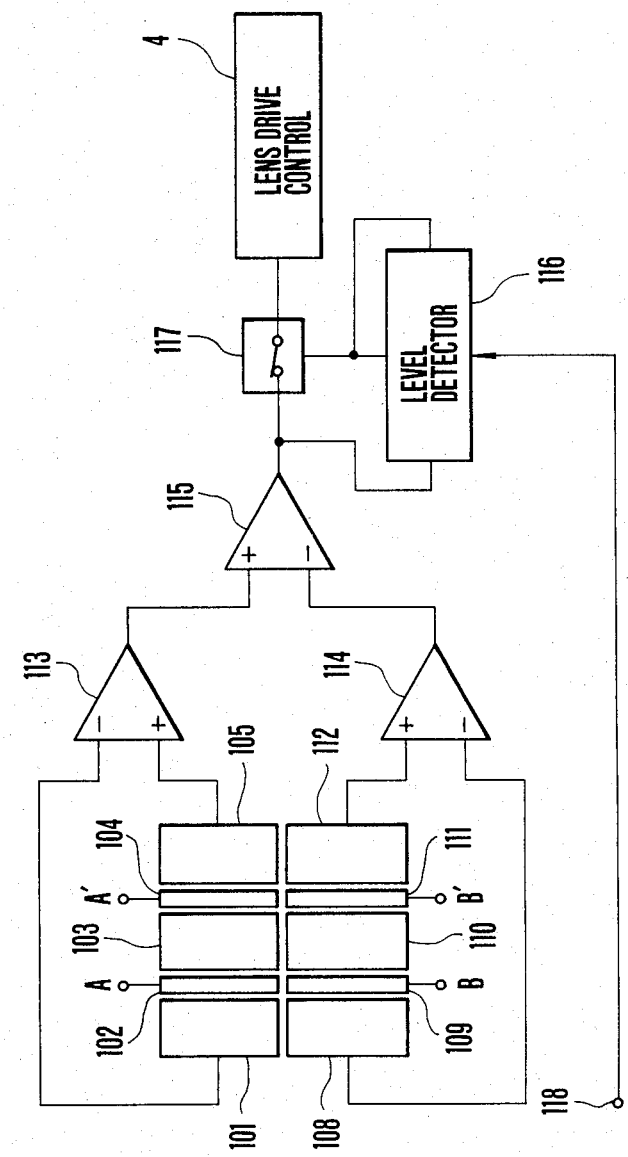
FIG. 2 is an electric circuit diagram illustrating the details of the light sensor and operating circuit of FIG. 1.

In FIG. 2, photosensitive elements 103 and 110 are respectively connected through gates 102 and 109 to potential wells 101 and 108, and also through gates 104 and 111 to potential wells 105 and 112. The potential wells 101 and 105 are connected to the inverting and non-inverting inputs of a differential amplifier 113 respectively. The potential wells 108 and 112 are connected to the inverting and non-inverting inputs of a differential amplifier 114 respectively. The outputs of amplifiers 113 and 114 are connected to the non-inverting and inverting inputs of a differential amplifier 115 whose output is connected to an electric motor or other suitable drive means for focus adjustment. Appearance of a signal representing the fact that a focus lock actuator is in operation at an inlet 118 enables a zero level detector circuit 116 and, when the output of differential amplifier 115 reaches zero level representing the in-focus condition, its output opens a switch 117.

Figure 3:
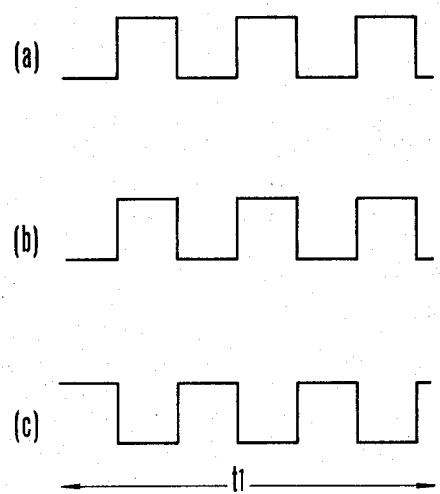
FIG. 3 is a pulse timing chart illustrating a manner in which the circuit of FIG. 2 operates.

The circuit of FIG. 2 operates as described by reference to FIG. 3. During a range finding operation indicated at t1 in FIG. 3, infrared emitting element 1 is energized by pulses to high (light-on) and low (light-off) levels as shown on line (a) in FIG. 3. Also potentials at electrodes A and B of gates 102 and 109 pulsate between high and low levels each in the same phase as the pulse for infrared emitting element 1 as shown in FIG. 3(b), while potentials at electrodes A' and B' pulsate in anti-phase as shown in FIG. 3(c). These gates are responsive to an input of high level to render the path between the photosensitive element and potential well non-conducting, and responsive to an input of low level to render it conducting. Therefore, when infrared light emitting element 1 gives off no light, gates 102 and 109 are gated on to transfer charges proportional to the intensity of ambient illumination generated in photosensitive elements 103 and 110 to potential wells 101 and 108 respectively. As a result, the potential wells 101 and 108 form voltages proportional to the accumulated charges. During the next time when infrared light emitting element 1 gives off light, gates 104 and 111 are gated on to transfer charges proportional to the sum of the intensities of the ambient light and the infrared light from photosensitive elements 103 and 110 to potential wells 105 and 112.

A difference between the voltages of potential wells 105 and 101 is taken by amplifier 113, and amplifier 113 produces an output in the form of a voltage proportional to the intensity of infrared light only coming from the target area to which infrared light emitting element 1 projects light. Similarly thereto, the output of differential amplifier 114 produces a voltage proportional to the intensity of infrared light only.

The optical system 2 is found to be focused to a shorter distance than the object when the infrared light incident on photosensitive element 103 is stronger than that on the other photosensitive element 110. The system is focused on the object when the intensities of the infrared light on the two photosensitive elements 103 and 110 are equal to each other, or when the output of differential amplifier 115 is zero. The system is focused to a longer distance than the object when the infrared light incident on photosensitive element 103 is weaker than that on the other element 110, or when the output of differential amplifier 115 is negative.

When the output of differential amplifier 115 is positive, the focus adjusting drive mechanism 4 moves the optical system 2 in a direction to effect focusing to longer distances. When negative, mechanism 4 moves the optical system 2 in a reversed direction to effect focusing to shorter distances. When the output of differential amplifier 115 is zero, focus adjusting drive mechanism 4 no longer moves the optical system. It is to be understood from the above that when the image is not in focus, the drive mechanism 4 is made to move in the direction corresponding to the polarity of the output of differential amplifier 115 until the image is brought into focus, and then hold the optical system 2 stationary in the in-focus condition.

Alternatively assuming that a focus lock is actuated, then prior to the making of an exposure, the infrared light emitting element 1 blinks to examine whether or not the image is in focus. If not, automatic focusing operates in a manner similar to that described above. When an in-focus condition is established, switch 117 is opened by the output of the level detector circuit 116. This renders the drive mechanism 4 is rendered. Thus, the optical system 2 has, despite the target line later changing, to be left unchanged from the position taken when the focus locking actuator was operated.

It is to be noted that in this embodiment the drive mechanism 4 is made inoperative by the output of the level detector circuit 116 but what is required in this connection is to make the drive mechanism 4 inoperative when the automatic focusing is completed. Therefore, other means, for example, a timer may be used instead.

Figure 4:
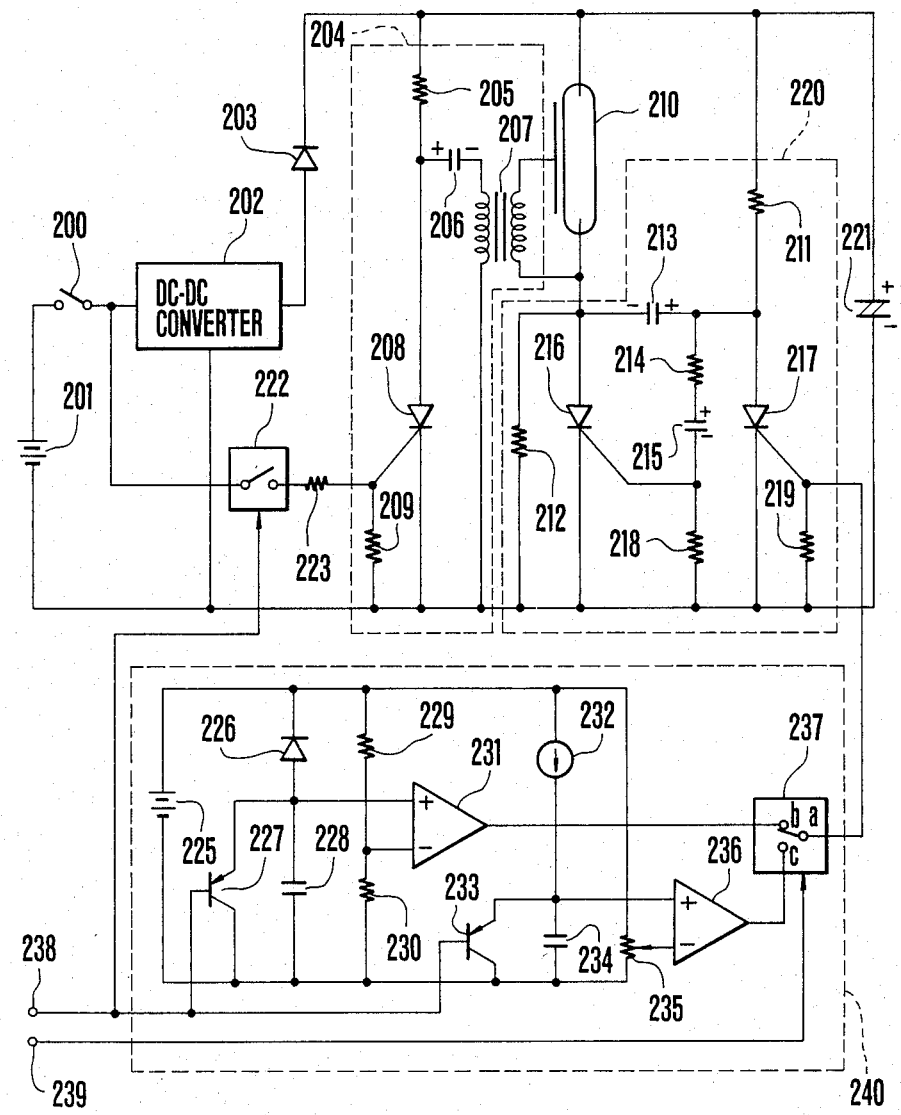
FIG. 4 is an electrical circuit diagram of a system comprising the camera of FIG. 1 and a flash device.

FIG. 4 illustrates an embodiment of a system of the camera having the automatic focus adjusting device of FIGS. 1 and 2 and a flash device according to the present invention.

In FIG. 4, a battery 201 is connected through a power switch 200 to the low input side of a direct current booster or DC-DC converter 202 having a high voltage side or output which is connected through a rectifier diode 203 to a trigger circuit of known construction enclosed within a dashed line block 204. The trigger circuit 204 includes a resistor 205, a trigger capacitor 206, a trigger transformer 207, a trigger thyristor 208 and a resistor 209. A firing control circuit of known construction enclosed in a dashing line block 220 includes resistors 211, 212, 214, 218 and 219, a commutation capacitor 213, a capacitor 215, a main thyristor 216 and a subthyristor 217, and a storage capacitor 221. A flash discharge tube 210 has an anode and a cathode connected between rectifier diode 203 and main thyristor 216 and has a trigger electrode connected to a high voltage terminal of trigger transformer 207. A series circuit of a switch 222 which is closed by a synchronizing signal and a resistor 223 is connected between the positive terminal of battery 201 and the gate of trigger thyristor 208. The gate of commutation thyristor 217 is connected to a movable pole, "a", of a change-over switch 237.

A flash exposure determining circuit enclosed within a dashed line block 240 produces a timing signal for termination of the firing of discharge tube 210. The circuit 240 includes a battery 225, a photosensitive element 226 for measuring the object brightness, a transistor 227, a capacitor 228, resistors 229 and 230, a comparator 231, a constant current circuit 232, a transistor 233, a capacitor 234, the potentiometer 235 (shown by 5 in FIG. 1), a comparator 236, and a change-over switch 237. In the switch 237 when the focus lock actuator is operated, pole, "a", is in contact with a throw, "c", and when in normal mode, pole is in contact with another throw, "b". The circuit includes a synchronizing signal inlet, and a focus lock signal inlet 239 (or 118 in FIG. 2).

The operation of the circuit of FIG. 4 is as follows: When power switch 200 is turned on, DC-DC converter 202 charges trigger capacitor 206, commutation capacitor 213, capacitor 215, and storage capacitor 221 to almost equal levels with polarities shown in the drawing.

After the voltage stored on the capacitors has reached the satisfactory operating level for producing flashes of light, and a synchronizing signal arrives at switch 222, switch 222 is closed for a moment. Then battery 201 supplies current through the synchronizing switch 222 and resistor 223 to the gating control electrode of thyristor 208, to turn on thyristor 208 and actuate trigger circuit 204. Flash discharge tube 210 is then rendered conductive by ionization to apply a high voltage on the anode of main thyristor 216. This causes current to flow through commutation capacitor 213, resistor 214 and capacitor 215 to the gate of main thyristor 216. This turns on main thyristor 216 and the discharge tube 210 starts to fire.

Now assuming that the focus locking was not carried out, the reflected light from an object is received by the photosensitive element 226. Since, at this time, transistor 227 is turned off by the synchronizing signal, capacitor 228 is gradually charged by current from photosensitive element 226. When the voltage on capacitor 228 exceeds a voltage at the tap of a voltage divider of resistors 229 and 230, comparator 231 changes its output to high, causing subthyristor 217 to turn on. Therefore, the firing control circuit 220 is actuated, causing discharge tube 210 to complete its firing.

Alternatively assuming that the focus locking was carried out, when focusing is locked, change-over switch 237 is moved from its "b" to its "c" position, and the position of the optical system 2 is adjusted to an automatic setting for the given object distance, and is translated to an output of potentiometer 235 which is applied to the inverting input of comparator 236. This output voltage increases as the object distance increases.

When the synchronizing signal is applied to inlet 238, trigger circuit 204 strikes a small arc within the discharge tube 210, and, at the same time, turns off transistor 233. Then, timing capacitor 234 is gradually charged with current from constant current circuit 232.

When the voltage on capacitor 234 just exceeds the voltage at the output of the potentiometer 235, the output of comparator 236 is changed to high, and is applied through switch 237 to the gate of subthyristor 217. This stops the firing of the discharge tube 210. Therefore, as the object distance increases, the amount of flash of light emitted increases. In other words, the flash exposure is controlled in accordance with the distance data found by the automatic focusing device and set in the potentiometer by the focus locking.

It is to be noted that though the automatic focus adjusting device used in the foregoing embodiment is of the active type having the range finding light source in itself, the principle of the invention is applicable to the passive type capable of focus adjustment with only ambient illumination.

As has been described above, according to the present invention makes it possible to achieve assurance that even when focusing is locked to allow a subject of principal interest to be shot out of alignment with the target line, the period of actuation of the flash device is controlled to derive as proper a flash exposure value for that subject as the photographer intends.

Another feature of the invention is that when the focus lock is not in use, the normal mode of flash exposure control by the light meter operates. Such arrangement makes the amount of flash of light emitted vary not only as a mere function of the object distance, but also with variation of the reflectivity of the scene. Therefore, the camera having the automatic focusing aspect is adapted always to derive a proper flash exposure value for the subject of principal interest in all situations.

Also, the flash device of the invention has first automatic light control means for controlling the amount of irradiating light of the flash tube in accordance with the output of a light meter responsive to the reflected light from an object to be photographed and second automatic light control means for controlling the amount of irradiating light in accordance with the camera-to-object distance regardless of the reflected light from the object. The first and second light control means can be selectively rendered operative. Therefore, it becomes possible that adjustment of the amount of irradiating light be controlled by taking into account what location the object lies at in the area of the picture frame. Particularly when shooting with the use of the focus lock, the selection of the second automatic light control means provides assurance that a correct flash exposure value with respect to the principal interest subject can be derived.

Whereas the present invention has been described in connection with one illustrated embodiment thereof, it is not limited thereto, and many more applications and modifications are possible within the scope of the invention construed in the appended claims.

What I claim:

1. A flash device for use with a photographic apparatus, comprising:
   (a) firing means for producing a flash of light;
   (b) light receiving means for receiving light reflected from an object to be photographed with the flash of light and for producing an output;
   (c) first light control means for stopping production of said flash of light in response to the output of said light receiving means;
   (d) second light control means for controlling the amount of light emitted from said firing means on the basis of object distance information; and
   (e) selecting means for selecting one of said first and said second light control means.

2. A flash device according to claim 1, wherein said selecting means selects said first and said second light control means depending upon the mode of operation of said photographic apparatus.

3. A flash device according to claim 2, wherein said photographic apparatus includes an exposure mode due to the focus lock, wherein when said exposure mode is selected, said selecting means selects said second light control means.

4. A photographic system comprising in combination:
   (A) a focus adjustable image forming optical system for forming an image of an object on a predetermined focal plane;
   (B) automatic focusing means for automatically focusing said optical system on the object;
   (C) focus lock means for locking the focus of said optical system;
   (D) flash means for emitting a flash to illuminate the object;
   (E) first control means for controlling the amount of flash irradiating the focal plane on the basis of the flash emitted from said flash means and reflected back from the object;
   (F) second control means for controlling the amount of flash irradiating the focal plane on the basis of an information on the distance to the object; and
   (G) selection means for selecting said second control means when said focus lock means is enabled.

5. The system according to claim 4, wherein said control means includes distance detecting means for detecting the object distance to produce said information on the distance.

6. The system according to claim 5, wherein said optical system includes a movable member movable for focusing the optical system on the object and said distance detecting means is operatively associated with said optical system to detect the object distance on the basis of the position of said movable member.

7. The system according to claim 6, wherein said distance detecting means includes a potentiometer operatively associated with said movable member of the optical system.

8. The system according to claim 5, wherein said first control means includes flash detecting means for detecting the flash emitted from said flash mens and reflected from the object.

9. The system according to claim 8, wherein said flash detecting means includes a photo-electric element arranged to receive the flash reflected from the object.

10. The system according to claim 4, wherein said first control means is arranged to cause said flash means to stop emission of the flash when the amount of the flash reflected back from the object reaches a predetermined value and said second control means is arranged to cause the flash means to stop emission of the flash when the amount of the flash emitted from the flash means reached a value determined on the basis of the object distance.

11. A flash exposure system for an automatic focusing camera with automatic focusing means for automatically focusing an objective on an object and selectively settable in an exposure mode with locked focus of the objective, said system comprising:
(A) flash means for emitting a flash to illuminate the object;
(B) first control means for controlling, on the basis of the flash emitted from said flash means and reflected back from the object, the amount of the flash impinging upon an image receiving plane arranged to receive an object image formed by the objective;
(C) second control means for controlling, on the basis of an information on the distance to the object, the amount of the flash impinging upon the image receiving plane; and
(D) selection means for selecting said second control means when the camera is set in said exposure mode with the locked focus of the objective.

12. The system according to claim 11, wherein said second control means includes distance detecting means for detecting the object distance to produce said information on the distance.

13. The system according to claim 12, wherein said distance detecting means is operatively associated with the objective to detect the object distance on the basis of the position of the objective.

14. The system according to claim 13, wherein said distance detecting means includes a potentiometer operatively associated with the objective.

15. The system according to claim 12, wherein said first control means includes flash detecting means for detecting the flash emitted from said flash means and reflected from the object.

16. The system according to claim 15, wherein said flash detecting means includes a photo-electric element arranged to receive the flash reflected from the object.

17. The system according to claim 11, wherein said first control means is arranged to cause said flash means to stop emission of the flash when the amount of the flash reflected from the object reaches a predetermined value and said second control means is arranged to cause the flash means to stop emission of the flash when the amount of the flash emitted from the flash means reaches a value determined on the basis of the object distance.

* * * * *